July 5, 1927.
W. E. GREENAWALT
METALLURGICAL PROCESS
Filed Dec. 6, 1926
1,634,497
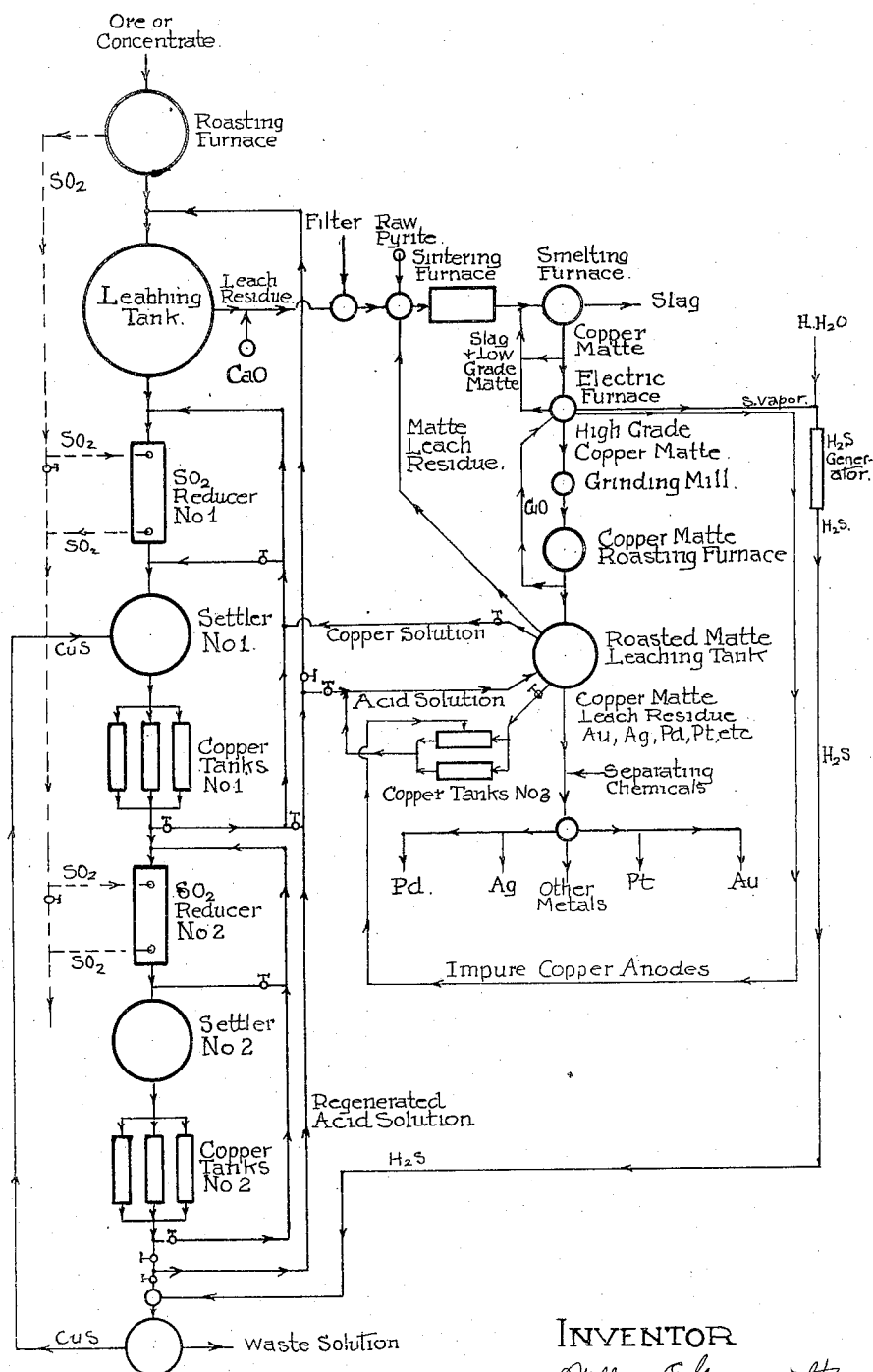
INVENTOR
William E Greenawalt Patented July 5, 1927.

1,634,497

UNITED STATES PATENT OFFICE.

WILLIAM E. GREENAWALT, OF DENVER, COLORADO.

METALLURGICAL PROCESS.

Application filed December 6, 1926. Serial No. 152,802.

The invention is more specifically directed to the treatment of copper ores containing precious metals, or precious metal ores containing copper. Rare metals, such as platinum, palladium and iridium are frequently associated with the precious metals in copper containing ores, and for the purpose of this process, may be considered much the same as the precious metals.

Ores are frequently found which contain copper and the precious metals, and quite frequently such ores contain rare metals which are sometimes more valuable than the precious metals. The economical treatment of such ores in the vicinity of the mines has presented a difficult problem, and if the ores are shipped to large industrial centers for treatment, the margin of profit to the miner is usually somewhat precarious.

The object of the process is to provide an economical treatment for such ores at the mines, which is capable of being operated in either very small or very large units, as occasion may require, with the production of the copper as the electrolytic metal and the rare or precious metals in highly concentrated form, or preferably as separate elemental metals, salable direct to the consumer.

This process may be considered as an improvement or modification of those described in my Patents, No. 1,353,995, Sept. 28, 1920, and No. 1,483,056, Feb. 5, 1924.

The accompanying flow sheet, in diagrammatic plan, will help in comprehending the process. The process can best be described in reference to a hypothetical ore, which, as mined, may be assumed as containing the following metal values: copper 1.5%, gold 0.05 oz., palladium 1.10 oz., platinum 0.025 oz., and silver 2.0 oz.

The direct treatment of such an ore for the recovery of the metals in elemental form would be quite impractical and uneconomical, except perhaps by smelting under favorable smelting conditions, and such ores are rarely, if ever, found in the vicinity of favorable smelting conditions.

Usually however such ores may be effectively concentrated either by gravity or flotation concentration, or both combined, with a high recovery of the metals in the form of a sulphide concentrate. Assuming a preliminary concentration to recover the metal values in the form of a relatively small amount of high grade concentrate, the concentrate may be assumed, for the purpose of this description, as containing 31.25% copper; 1.0 oz. gold; 2.0 oz. palladium; 0.5 oz. platinum; and 40 oz. silver, per ton of concentrate.

Such a concentrate could be shipped and smelted but probably at a prohibitive cost to the miner and he would lose control of the marketing of his product. The concentrate could be smelted direct, but the smelting of a 31.25% copper concentrate to a 50% or 60% matte would not be much of an improvement and the expense would be considerable. If the concentrate is roasted and leached, the recovery of the rare or precious metals from a large volume of leached residue by solvent methods alone also presents a difficulty and probably an impractical condition.

The present method contemplates a departure from the ordinary smelting and leaching methods, in which however both methods are employed in such a relation as to convenienently and economicaly give the copper as the electrolytic metal and the rare or precious metals in a highly concentrated or in elemental form.

In carrying out the process, the concentrate is carefully roasted so as to make a large portion of the copper soluble in water and a very large portion soluble in a dilute acid solution. It is difficult to roast such a high grade copper concentrate to get over 95% to 98% extraction of the copper by ordinary leaching methods. For the purpose of this process a higher extraction is not necessary, nor is it desirable.

The roasted concentrate is then leached with water or a dilute sulphuric acid solution to extract the copper. The copper which is soluble in water or dilute acid is easily and quickly extracted. The rare or precious metals remain in the residue.

The copper solution from the leaching tank, containing salts of iron, flows into the $SO_2$ reducer where ferric iron is reduced to the ferrous condition by the $SO_2$ obtained from roasting the sulphide concentrate. The reduced solution then flows into the storage or settling tank No. 1 where the ferric iron is still further reduced by the small excess of $SO_2$ dissolved in the solution, and the solution is clarified. The solution then flows into the copper tanks No. 1, where copper is deposited as the electrolytic metal with the simultaneous regeneration of acid and ferric iron. A portion of the solution from the copper tanks No. 1 is returned to the reducer No. 1, while another portion—the advance flow—is flowed into the reducer No. 2 and from there to settler No. 2 and into the copper tanks No. 2, where more copper is deposited and acid and ferric iron regenerated. A portion of the solution from the copper tanks No. 2 is returned to the $SO_2$ reducer No. 2, while another portion—the advance flow—is returned to the roasted concentrate to pass through another complete cycle. In this way the copper is extracted from the roasted concentrate and converted into the electrolytic metal, and when the copper in the concentrate has been sufficiently extracted, the concentrate residue is ready for the next step in the treatment. The amount of copper it is desirable to keep in the residue will be determined by the operator and will have to be determined by experience. Usually it will be the copper which is not readily soluble in an acid solution, and this will usually be the desired amount for the succeeding step in the process, altho the residual copper in the leached concentrate residue may vary within wide limits, without interfering with the successful operation of the process. A fair operating basis would be an extraction of 30% of the 31.25% of the copper in the concentrate, or an extraction of about 96%, or 600 pounds of copper per ton of concentrate.

If the capacity of the plant is assumed as ten tons per day, the daily output of electrolytic copper from leaching the roasted concentrate would be 6000 pounds. The residue would still contain 1.25% of the 31.25% copper in the original concentrate and all of the rare or precious metals. But the residue will weigh not more than half of the original concentrate, since most of the copper has been extracted, the sulphur which was originally combined with the copper has been eliminated, the sulphur combined with the iron has been exchanged for oxygen, and other volatile and soluble constituents of the original concentrate have been removed in the roasting and leaching.

The residue may now be assumed to weigh half as much as the original concentrate, but it will contain all of the rare or precious metals and will assay 2.5% copper, which represents the 1.25% of the 31.25% in the original concentrate.

In cyclically leaching the roasted copper concentrate with an acid solution and electrolyzing the resulting copper solution containing salts of iron, the solution will ultimately become foul. A certain amount of the solution is therefore diverted from the leaching and electrolytic circuit and the copper precipitated therefrom and the solution wasted. A certain amount of washwater is added to make up the loss, and this washwater also tends to greatly reduce the soluble copper content of the leached residue, but will not remove all of the soluble copper.

In order to avoid waste washwater complications, the residue after it is leached and partly washed as described, is treated with lime to neutralize the solution and to precipitate the soluble copper in the residue. The residue is then filtered in an ordinary filter to remove excess water, and sintered. The sintered residue is then smelted, preferably with just enough raw sulphide ore to make a suitable matte to make a high recovery of the copper and rare or precious metals. The sulphide material should preferably be precious metal bearing pyrites, free or quite free from copper, but containing enough silica to flux off excess iron. Such a procedure will give a clean slag and the metal values will be in fairly concentrated form. If one smelting is not sufficient to give the concentration desired, the first matte may be resmelted, so that the matte will be largely or entirely in the form of $CuS$ or $Cu_2S$, containing little or no iron, altho it will be difficult to eliminate the iron entirely. It is desirable for the best operation of the process to eliminate it as much as practical. If resmelting of the first matte is necessary, the slag from the second smelting may be added to the first smelting charge of another lot. In this way a very high recovery of the copper and rare or precious metals may be made from the leach residue in the form of a highly concentrated matte and at a relatively small cost for smelting. It should be remembered that the residue smelted is only half that of the original concentrate.

Disregarding the small loss in smelting, the matte will consist principally of 250 pounds of copper with the combined sulphur of from 150 to 175 pounds, or say 375 pounds in all, and this matte or copper sulphide will contain all of the rare or precious metals; or approximately, copper 250 pounds; gold 10.0 oz.; palladium 20.0 oz.; platinum 5.0 oz.; and silver 400 oz. It will have an approximate value of $2600.00, and will permit of careful and economical treatment to recover the various metals in marketable form.

This small portion of high grade matte, weighing about 375 pounds is ground and carefully roasted, and then leached. It is preferably leached with the regenerated acid solution from the electrolytic tanks in the deposition of the copper from leaching the roasted concentrate. The copper oxide or copper sulphate, resulting from roasting the matte, will easily go into solution as the copper sulphate, and this copper sulphate solution is returned to the leaching and electrolytic circuit, and need not be given further special attention. The roasted copper matte residue practically free from copper is then washed. If there is still some copper left in the residue the residue may be treated with strong sulphuric acid with the application of heat until all or practically all of the copper is removed. The residue then contains the rare or precious metals in a highly concentrated form and in a condition to be easily attacked by suitable chemicals for their separation. The silver and palladium may be dissolved with nitric acid, while the gold and platinum remain undissolved. The silver may be precipitated from the nitrate solution with chlorine or a chloride, which may be removed by filtration, and the palladium contained in the filtrate may then be precipitated by means of zinc, or mercury cyanide and the palladous cyanide leaves on ignition spongy metallic palladium. The gold and paltinum remaining in the residue may be separated with chlorine or aqua regia. If the residue contains foreign matter, it may be aded to a new smelting charge. This would avoid the necessity of close or complete extraction of the rare or precious metals from the high grade matte, especially if the high grade matte is associated with a large proportion of iron or silica.

The advantage of this method of procedure over the usual methods may be shown by the following considerations: If the concentrate is smelted by the ordinary method, the 31.25% copper concentrate would be smelted into a copper matte containing from 50% to 60% copper, and the rare or precious metals would still be associated with the original copper of the concentrate, and the matte would not have much more value than the original concentrate. If the matte is converted into blister copper, and if the blister copper is refined by the regular refining methods, it would mean all the refining accessories of an electrolytic refining plant, and the rare or precious metals would not be available until the copper is refined and the residual slime collected from the copper tanks.

If the concentrate were treated by the usual method of leaching, the copper would be leached out of the roasted concentrate as closely as possible, and the leached residue would then be treated with stronger solvents for the extraction of the remaining copper and the rare or precious metals. The residual copper might interfere with the treatment of the residue with cyanide for the extraction of the gold and silver, and the rare metals would not be recoverable with a cyanide solution. If the residue were treated with gaseous chlorine or chlorine water, the gold and the palladium could be extracted more or less satisfactorily, but the silver and platinum would not be appreciably affected. If chlorinated brine is used the silver could be largely extracted with the gold and palladium, but not satisfactorily, if present in considerable amounts, and the chlorinated brine would not appreciably attack the platinum. If strong acids, such as nitric acid or aqua regia, are used as solvents, the expense would be practically prohibitive, and the extraction of the rare and precious metals would be more or less incomplete. The extraction of the assumed 250 pounds of copper and considerable iron with the rare or precious metals resulting from the use of strong solvents would also present a problem, although not an insurmountable one. All things considered, therefore, the direct solvent treatment of the copper leached residue for the recovery of the rare or precious metals and residual copper presents many serious difficulties.

If, however, the leached roasted concentrate residue, amounting to about half of the original concentrate, is smelted, the residual copper and the rare or precious metals may be converted into a high grade matte, and if this matte is concentrated sufficiently to eliminate all or most all of the iron and other impurities so that the matte will practically have the composition of CuS or $Cu_2S$, it will be seen that on roasting and leaching this matte the copper and sulphur will be practically eliminated, and that the rare or precious metals will be in the residue in a highly concentrated form and in a condition to be easily separated. The recovery of the copper and the rare or precious metals will be exceedingly high. When the stronger solvents are applied to the leached roasted matte residue there will be very little copper or iron present to consume chemicals or to contaminate the resulting solutions, in the recovery or separation of the rare or precious metals. While in practice it is difficult to get a copper matte free from iron, nevertheless the object should be to approach such a condition as closely as practical. It is evident that if all the iron could be eliminated from the matte, so as to have a matte consisting of copper sulphide, and the copper sulphide matte is roasted and leached to dissolve the copper, there would be nothing left in the roasted and leached matte residue but the rare or precious metals, so that the rare or precious metals could be easily and quickly recovered at a very small expense.

There is an advantage in concentrating the matte to CuS or $Cu_2S$ containing no iron, or only a relatively small amount of iron—that is to say, relatively small as compared with the ordinary matte in the usual smelting operations which is converted into blister copper—because in roasting the matte containing iron, ferrites and ferrates are formed which make it difficult to get a high extraction of the copper, with the usual solvents used in leaching under ordinary conditions, whereas if the matte is composed of copper sulphide free from iron, ferrites and ferrates cannot be formed in roasting, and the extraction of the copper can be made practically complete, and there will be no appreciable amount of residue after the copper leaching to complicate the separation or recovery of the rare or precious metals. The object in operating the process should be to eliminate the iron from the matte, but as the total elimination of the iron offers practical difficulties, it should be eliminated as completely as practical.

It will be seen, in treating ten tons of concentrate per day, that only about five tons of residue is smelted, including the pyritic addition to the charge; that the five tons of leached residue will be concentrated by smelting into about 375 pounds of matte consisting mostly or entirely of copper sulphide; and that by roasting and leaching the matte, the leached roasted matte residue will contain the rare or precious metals in a highly concentrated form from which they can be easily recovered, or separated from one another.

In smelting the five tons of leached residue, the copper necessary for collecting the rare or precious metals may be kept quite low. The copper content of the smelting charge will largely be governed by the amount of copper which is not readily extracted by leaching, and, as all, or practically all, of the copper remaining in the leached residue is recovered by smelting, the roasting and leaching of the concentrate need not be as carefully carried out as would be necessary under other conditions, and the operator can determine the sufficiency of the extraction of the copper by leaching to best carry out the process as a whole.

With the small amount of copper in the leached concentrate residue, the slag from the smelting will be very low in copper, especially as compared with a slag if the concentrate containing 31.25% copper were smelted, and the matte, in smelting the leached residue, will be adjusted to make a high recovery of the rare or precious metals as well as the copper. In re-smelting the matte to eliminate the iron, the slag will contain appreciable values in copper and the rare or precious metals, and this slag is returned to the smelting furnace as a portion of a new charge.

After the copper concentrate has been roasted and leached, there will be only a very small amount of sulphur left in the residue, usually a fraction of one per cent. If this residue is sintered by blast roasting, preparatory to smelting, some combustible will have to be added to provide the necessary heat to cause agglomeration or semi-fusion necessary to produce a good sintered product. This combustible is preferably added as a pyritic material containing rare or precious metals, with the required amount of silica to flux excess iron, but containing little or no copper. If, however, the desired pyritic material is not conveniently obtainable in the amount required to provide the necessary sulphur for sintering and matting, a carbonaceous combustible, such as fine coal, coke, or charcoal, may be added to the residue for sintering, and the necessary amount of pyritic material for matting may be added direct to the furnace charge.

In concentrating the matte produced by smelting the leached residue, it may be desirable to do it in an electric furnace, where a reducing atmosphere may be maintained. In this way the sulphur may be volatilized in elemental form, and arsenic and antimony, if present, may be eliminated. The iron may be slagged off. The resulting matte will consist entirely, or almost entirely, of cuprous sulphide, $Cu_2S$, which corresponds to the mineral chalcocite, and, if pure, contains 79.8% copper and 20.2% sulphur. This makes a very desirable product for subsequent roasting and leaching.

The sulphur of the matte from the smelting furnace which is combined with the iron and with the copper as CuS is volatilized at a comparatively low temperature, but it requires a high temperature—practically a white heat—to volatilize the sulphur of the $Cu_2S$. It is preferred to run the hot molten matte from the smelting furnace into the electric refining furnace, and to maintain the temperature such that the sulphur of the iron sulphide and of the cupric sulphide are quickly volatilized, while avoiding the higher temperature necessary to dissociate the cuprous sulphide. In this way the cost will be reduced to a minimum for the reason that in treating material in an electric furnace one of the largest items of expense is the energy required to bring the material to a molten condition, and if excessively high temperatures are avoided, such as those required to dissociate cuprous sulphide, the treatment in the electric furnace will require little more energy than that necessary to maintain the relatively low temperature needed for the volatilization of the sulphur from the iron and cupric sulphide of the matte. The slag from the electric furnace will be resmelted as a portion of a new charge in the smelting furnace. In this way the only metal loss will be in the very lean slag from the smelting furnace.

The volatilized sulphur, as sulphur vapor, may be combined with hydrogen to form hydrogen sulphide, and the hydrogen sulphide so produced may be used to precipitate copper from lean or foul leach solutions. If steam or a hydrocarbon is introduced into the electric furnace a mixture of sulphur and hydrogen sulphide will issue from the furnace. It is preferred to combine the sulphur with hydrogen outside of the furnace.

Hydrogen sulphide begins to dissociate at about 400 degrees C., and increases with the rise in temperature. Careful regulation of the combining gases is important, and the temperature of the gases should not greatly exceed 500 degrees C. to prevent the dissociation of hydrogen sulphide.

While the regulation of the temperature of the molten matte in the electric furnace is quite easy, the regulation of the temperature of the gases in the furnace is quite difficult, if not impractical, to get the maximum amount of hydrogen sulphide with a minimum amount of free hydrogen and free sulphur.

To meet this condition, the gases are passed through the $H_2S$ generator, where the conditions for the maximum production of hydrogen sulphide can be controlled and regulated. The temperature may be maintained to get the maximum formation of hydrogen sulphide from the sulphur vapor and the hydrogen containing fluid introduced into the $H_2S$ generator. In addition to the close regulation of temperature, the $H_2S$ generator may and usually will contain material which promotes the formation of hydrogen sulphide, such as coke, pumice or glass. The generator may conveniently consist of a tube or chamber containing coke or a catalyst such as pumice or glass, which may be heated indirectly through the walls of the chamber, or directly by an electric current, to the desired temperature, or say, from 400 to 500 deg. C. The mixture of hydrogen sulphide, hydrogen containing fluid and sulphur vapor is passed through the $H_2S$ generator to combine the hydrogen of the hydrogen containing fluid with the uncombined sulphur vapor to form an equivalent of hydrogen sulphide. The gas is then used to precipitate the copper or other metals from solutions, especially from waste foul copper solutions and lean washwaters.

In the production of hydrogen sulphide, either in the electric furnace or in the $H_2S$ generator, a hydrocarbon, preferably in the form of oil or crude gas, may be used with or without steam and forms a convenient way of supplying hydrogen or a hydrogen containing fluid and maintaining the reducing atmosphere desired for good operating conditions. Good results can be obtained by introducing hydrogen or a hydrogen containing fluid into the electric furnace or into the $H_2S$ generator. The source of hydrogen which is best available for any particular condition would naturally be used.

The hydrogen sulphide is used to precipitate the copper from the lean wash waters or waste foul solutions. The resulting CuS precipitate is separated from the solution, and the solution may be wasted. The CuS precipitate is preferably applied to the electrolyte of the leaching and electrolytic circuit, where it may be used to reduce the ferric iron formed by the electrolytic deposition of the copper to the ferrous condition, while at the same time the copper of the precipitate is converted into the electrolytic metal, as described more fully in my Patents No. 1,340,826, May 18, 1920, and No. 1,357,495, Nov. 2, 1920.

It will be seen, in treating ten tons of concentrate per day, that only about five tons of residue is smelted, including the pyritic addition to the charge; that the five tons of leached residue will be concentrated by smelting into a relatively small amount of high grade matte containing copper and iron sulphides, and that by treating the matte in the electric furnace as described to dissociate the sulphur of the iron and cupric sulphides, a very high grade matte is obtained consisting principally of cuprous sulphide, $Cu_2S$, containing the rare or precious metals, and weighing about 310 pounds. This small amount of copper sulphide is easily and cheaply pulverized and roasted, and when leached, the extraction should be complete, or practically so, since there would be no ferrites or ferrates to interfere. The copper would be produced as the pure electrolytic metal, and the rare or precious metals would remain in the leached and de-coppered residue in highly concentrated form, from which they could easily be recovered, or separated from one another.

In smelting the five tons of leached concentrate residue, the copper necessary for collecting the rare or precious metals may be kept quite low. The copper content of the smelting charge will be largely governed by the amount of copper which is not easily extracted by leaching, and, as all, or practically all, of the copper remaining in the leached residue is recovered by smelting, the roasting and leaching of the concentrate need not be as carefully carried out as would be necessary under other conditions, and the operator can determine the sufficiency of the extraction of the copper by leaching to best carry out the process as a whole.

With the small amount of copper in the leached residue, the slag from smelting will be very low in copper, especially as contrasted with a slag if the concentrate containing 31.25% copper were smelted, and the matte, in smelting the residue, will be adjusted so as to make a high recovery of the rare or precious metals as well as of the copper. In re-smelting the matte, or in concentrating it in an electric furnace as described, the slag will contain appreciable values in copper and in the rare or precious metals, and this slag is returned to the smelting furnace. This procedure makes possible a high recovery of the metals, with the metals in elemental form as the end products.

The elimination of sulphur and the production of concentrated copper sulphide may be facilitated by adding a portion of the concentrated copper oxide, obtained from roasting the concentrated copper sulphide, to the impure copper sulphide in the electric furnace. The reaction between copper oxide and copper sulphide to eliminate sulphur, as sulphur dioxide, is well known.

If desired, the practically pure copper solution, obtained from leaching the concentrated copper oxide, may be electrolyzed in a separate circuit, or in copper tanks No. 3, and when the solution becomes too acid, or too impure, it may be diverted to the main leaching and electrolytic circuit. The reaction between concentrated copper sulphide and concentrated copper oxide in the electric furnace may at times be advantageously carried far enough to produce the impure metallic copper, or the impure copper mixed with more or less copper sulphide. This impure copper may be cast into anodes and the anodes may be refined electrolytically by using the relatively pure copper leach solution from the roasted concentrate or from the concentrated copper oxide as the electrolyte.

I claim:

1. A process of treating copper concentrate containing rare or precious metals comprising, roasting the concentrate, leaching the roasted concentrate with a solvent for the copper, then when the copper has been sufficiently extracted from the roasted concentrate by leaching, smelting the residue to concentrate the residual copper and the rare or precious metals into a matte, roasting the matte, leaching the roasted matte to extract the copper, and then treating the roasted matte residue to recover the rare or precious metals.

2. A process of treating copper concentrate containing rare or precious metals comprising, roasting the concentrate, leaching the roasted concentrate with an acid solution to extract the copper, then when the copper has been sufficiently extracted by leaching, smelting the residue to concentrate the residual copper and the rare or precious metals into a copper matte, roasting the copper matte, leaching the roasted matte to extract the copper, treating the leached matte residue to recover the rare or precious metals, and adding the leached matte residue to a new smelting charge.

3. A process of treating copper concentrate containing rare or precious metals comprising, roasting the concentrate, leaching the roasted concentrate with an acid solution to extract the copper, electrolyzing the resulting copper solution to deposit the copper and regenerate acid, smelting the leached concentrate residue to concentrate the residual copper and the rare or precious metals into a matte, roasting the matte, leaching the roasted matte with the regenerated acid solution from the copper deposition to extract the copper from the roasted matte, and treating the leached roasted matte residue to recover the rare or precious metals.

4. A process of treating copper concentrate containing rare or precious metals comprising, roasting the concentrate, leaching the roasted concentrate with an acid solution to extract the copper, electrolyzing the resulting copper solution to deposit the copper and regenerate acid, returning the regenerated acid solution to the roasted concentrate and repeating the cycle until the copper has been sufficiently extracted, then smelting the residue to concentrate the residual copper and the rare or precious metals into a copper matte, roasting the matte, leaching the roasted matte with a portion of the regenerated acid solution of the concentrate leaching and electrolytic circuit, and returning the resulting copper solution to the concentrate leaching and electrolytic circuit.

5. A process of treating copper concentrate containing rare or precious metals comprising, roasting the concentrate, leaching the roasted concentrate with an acid solution to dissolve the copper, separating a portion of the dissolved copper from the leached residue and precipitating the copper therefrom, precipitating another portion of the dissolved copper in the leached residue, then smelting the residue to concentrate the residual copper and the rare or precious metals into a copper matte, roasting the matte, leaching the roasted matte to extract the copper, and then treating the leached matte residue to recover the rare or precious metals.

6. A process of treating copper concentrate containing rare or precious metals comprising, roasting the concentrate, leaching the roasted concentrate with a suitable solvent for the copper, separating a portion of the dissolved copper from the leached residue and precipitating the copper therefrom, precipitating another portion of the dissolved copper in the leached residue, smelting the residue to concentrate the residual copper of the residue into a copper matte containing the rare or precious metals, roasting the matte, leaching the roasted matte to extract the copper therefrom, and treating the roasted matte residue to separate or recover the rare or precious metals.

7. A process of treating copper concentrate containing rare or precious metals comprising, roasting the concentrate, leaching the roasted concentrate to extract the copper, adding a pyritic material to the leached residue, smelting the mixture of leached residue and pyritic material to produce a lean slag and to concentrate the residual copper and the rare or precious metals into a copper matte, wasting the slag, resmelting the matte to further concentrate it in copper and the rare or precious metals, adding the slag from the re-smelting of the matte to a new smelting charge, roasting the concentrated matte, leaching the roasted matte to extract the copper, and separating or recovering the rare or precious metals from the leached matte residue.

8. A process of treating copper concentrate containing rare or precious metals comprising, roasting the concentrate, leaching the roasted concentrate to extract the copper, then when the copper in the roasted concentrate has been sufficiently extracted adding lime to the leached residue, filtering the residue, adding a pyritic material to the leached residue, smelting the mixture of leached residue and pyritic material to produce a copper matte containing the rare or precious metals, roasting the matte, leaching the roasted matte to extract the copper, and recovering the rare or precious metals from the leached roasted matte residue.

9. A process of treating copper concentrate containing rare or precious metals comprising, roasting the concentrate, leaching the roasted concentrate with an acid solution to extract the copper, electrolyzing the resulting copper solution to deposit the copper and regenerate acid and repeating the cycle until the copper has been sufficiently extracted from the roasted concentrate, then smelting the leached roasted concentrate residue to concentrate the residual copper and rare or precious metals into a matte, roasting the matte, leaching the roasted matte with an acid solution to extract the copper, electrolyzing the resulting copper solution to deposit the copper and regenerate acid, returning the regenerated acid solution to the roasted matte and repeating the cycle until the copper in the roasted matte is sufficiently extracted, then treating the roasted matte residue to separate or recover the rare or precious metals.

10. A process of treating copper concentrate containing rare or precious metals comprising, roasting the concentrate, leaching the roasted concentrate to extract the copper, smelting the leached roasted concentrate residue to concentrate the residual copper into a matte containing the rare or precious metals, re-smelting the matte to obtain a higher grade matte consisting of copper sulphide relatively free from iron, roasting the copper matte, leaching the roasted matte to extract the copper, and treating the roasted matte residue to separate or recover the rare or precious metals.

11. A process of treating copper concentrate containing rare or precious metals comprising, roasting the concentrate, leaching the roasted concentrate to extract the copper, smelting the leached concentrate residue to concentrate the residual copper into a copper matte containing the rare or precious metals, treating the matte to eliminate iron, roasting the matte, leaching the roasted matte to extract the copper, and treating the roasted and leached matte residue to separate or recover the rare or precious metals.

12. A process of treating copper concentrate containing rare or precious metals comprising, roasting the concentrate, leaching the roasted concentrate with an acid solution to extract the copper, electrolyzing the resulting copper solution containing salts of iron to deposit the copper and regenerate acid and ferric iron, applying the sulphur dioxide from the roasting furnace to the electrolyzed copper solution to reduce ferric iron formed by the electrolysis to the ferrous condition and again electrolyzing the solution, returning the impoverished copper solution to the roasted concentrate to dissolve more copper and repeating the cycle until the copper in the concentrate is sufficiently extracted, adding a pyritic material to the leached residue, smelting the mixture of leached residue and pyritic material to concentrate the residual copper and the rare or precious metals into a matte, treating the resulting matte to eliminate iron, and then treating the resulting concentrated copper product to separate the copper from the rare or precious metals.

13. A process of treating copper concentrate containing rare or precious metals comprising, roasting the concentrate, leaching the roasted concentrate to extract the copper, adding a combustible to the leached residue, sintering the leached residue, adding a pyritic material to the sintered residue, smelting the mixture of sintered residue and pyritic material to concentrate the residual copper of the leached residue into a matte containing the rare or precious metals, treating the resulting matte to eliminate iron, and treating the resulting concentrated copper product to separate the copper and the rare or precious metals.

14. A process of treating copper concentrate containing rare or precious metals comprising, roasting the concentrate, leaching the roasted concentrate to extract the copper, adding a pyritic or other combustible material to the leached residue, sintering the mixture, smelting the sintered residue into a copper matte containing the rare or precious metals, roasting the matte, leaching the roasted matte to extract the copper, and treating the matte residue to separate or recover the rare or precious metals.

15. A process of treating copper concentrate containing rare or precious metals comprising, roasting the concentrate, leaching the roasted concentrate with an acid solution to extract the copper, electrolyzing the resulting copper solution to deposit the copper and regenerate acid, returning the regenerate acid solution to the roasted concentrate and repeating the cycle, and when the copper has been sufficiently extracted, adding lime to the leached residue, filtering or dewatering the residue, adding a pyritic or other combustible material to the leached residue, sintering the residue, smelting the residue to concentrate residual copper and the rare or precious metals into a matte containing iron, resmelting the matte to eliminate iron, roasting the resulting matte, leaching the roasted matte to extract the copper, and separating or recovering the rare or precious metals from the leached matte residue.

16. A process comprising, leaching copper ore or concentrate containing rare or precious metals to extract the copper, smelting the resulting leached residue to concentrate the residual copper and the rare or precious metals into a matte, heating the matte in an electric furnace at a temperature between the dissociation point of cupric sulphide and cuprous sulphide, leaching the copper from the resulting highly concentrated copper product, and recovering or separating the rare or precious metals from the leached residue.

17. A process comprising smelting copper bearing material to produce a matte, heating the resulting matte in an electric furnace so as to dissociate sulphur from the iron sulphide and from the cupric sulphide and to produce substantially cuprous sulphide, roasting the cuprous sulphide, and leaching the roasted cuprous sulphide to extract the copper.

18. A process comprising, smelting copper bearing material to produce a matte, heating the resulting matte in an electric furnace so as to dissociate sulphur from the iron sulphide and from the cupric sulphide and to produce substantially cuprous sulphide, roasting the cuprous sulphide, leaching the roasted cuprous sulphide with an acid solution to extract the copper, and electrolyzing the resulting copper solution to obtain the copper as the electrolytic metal.

19. A process of treating copper concentrate containing rare or precious metals comprising, roasting the concentrate, leaching the roasted concentrate to extract the copper, smelting the leached concentrate residue to concentrate the residual copper and the rare or precious metals into a matte, electrically heating the matte to volatilize or dissociate sulphur and to slag off iron so as to produce a higher grade matte consisting of copper sulphide practically free from iron, roasting the resulting copper sulphide, leaching the roasted copper sulphide to extract the copper, and recovering or separating the rare or precious metals from the leached roasted matte residue.

20. A process of treating copper concentrate containing rare or precious metals comprising, roasting the concentrate, leaching the roasted concentrate to extract the copper, adding carbonaceous fuel to the leached concentrate residue, sintering the residue, adding a pyritic material to the leached and sintered residue, smelting the mixture to concentrate the residual copper and the rare or precious metals into a matte, roasting the matte, leaching the roasted matte to extract the copper, and recovering or separating the rare or precious metals from the leached matte residue.

21. A process of treating copper concentrate containing rare or precious metals comprising, roasting the concentrate, leaching the roasted concentrate to extract the copper, smelting the leached concentrate residue to concentrate the residual copper and the rare or precious metals into a matte, heating the resulting matte in an electric furnace to dissociate some of the sulphur of the matte, combining the dissociated sulphur with hydrogen to form hydrogen sulphide, precipitating copper from the leach solutions with the hydrogen sulphide, roasting the enriched matte from the electric furnace, leaching the roasted matte to extract the copper, and treating the leached matte residue to separate or recover the rare or precious metals.

22. A process of treating copper concentrate containing rare or precious metals comprising, roasting the concentrate, leaching the roasted concentrate to extract the copper, smelting the resulting leached concentrate residue to concentrate residual copper and the rare or precious metals into a copper matte, heating the matte in an electric furnace to dissociate sulphur and slag off iron so as to produce concentrated copper sulphide, roasting concentrated copper sulphide to produce concentrated copper oxide, and adding the concentrated copper oxide to the copper sulphide in the electric furnace.

23. A process comprising, leaching copper concentrate, smelting the resulting leached residue to concentrate residual copper into copper matte, heating the copper matte in an electric furnace to dissociate sulphur and slag off iron so as to produce concentrated copper sulphide, roasting the concentrated copper sulphide to produce concentrated copper oxide, and adding a portion of the concentrated copper oxide to the impure copper sulphide in the electric furnace.

24. A process comprising, roasting copper concentrate, leaching the roasted concentrate to extract the copper, smelting the resulting leached residue to concentrate residual copper into copper matte, treating the matte to eliminate sulphur and iron so as to produce concentrated copper sulphide, roasting the concentrated copper sulphide to produce concentrated copper oxide, leaching the concentrated copper oxide with an acid solution to extract the copper, electrolyzing the resulting copper solution to deposit the copper and regenerate acid, and returning the regenerated acid solution to the concentrated copper oxide, and repeating the cycle.

25. A process of treating copper concentrate comprising, roasting the concentrate, leaching the roasted concentrate to extract copper, smelting the leached concentrate residue to concentrate residual copper into matte, heating the matte to eliminate sulphur and slag off iron so as to produce concentrated copper sulphide, and adding concentrated copper oxide to the heated copper sulphide to eliminate more sulphur.

26. A process of treating copper concentrate comprising, roasting the concentrate, leaching the roasted concentrate to extract copper, smelting the leached concentrate residue to concentrate the residual copper into matte, electrically heating the matte to dissociate sulphur and slag off iron so as to produce concentrated copper sulphide, and adding concentrated copper oxide to the electrically heated concentrated copper sulphide to eliminate more sulphur.

27. A process of treating copper concentrate comprising, roasting the concentrate, leaching the roasted concentrate to extract copper, smelting the leached concentrate residue to concentrate the residual copper into a matte, heating the matte to eliminate sulphur and slag off impurities so as to produce a concentrated copper sulphide, adding concentrated copper oxide to the heated concentrated copper sulphide to produce impure copper, casting the impure copper into anodes, and subjecting the impure copper anodes to electrolysis to recover the copper as the electrolytic metal.

28. A process of treating copper concentrate comprising, leaching the concentrate to extract copper, smelting the leached concentrate residue to concentrate residual copper into copper matte, heating the matte to eliminate sulphur and slag off impurities so as to produce concentrated copper sulphide, roasting a portion of the concentrated copper sulphide to produce concentrated copper oxide, leaching a portion of the concentrated copper oxide to extract the copper as a relatively pure copper sulphate solution and electrolyzing the solution to deposit the copper and regenerate acid, adding a portion of the concentrated copper oxide to the heated copper sulphide to eliminate more sulphur from the copper sulphide so as to produce impure copper, casting the impure copper into anodes, and refining said anodes with the copper sulphate solution obtained from leaching the concentrated copper oxide or from leaching roasted copper concentrate.

29. A process of treating copper concentrate containing rare or precious metals comprising, roasting the concentrate, leaching the roasted concentrate to dissolve the copper, separating a portion of the dissolved copper from the leached residue and precipitating the copper therefrom, precipitating a portion of the dissolved copper in the leached residue, then smelting the residue to concentrate the residual copper into the impure metal containing the rare or precious metals, then electrolytically refining the impure copper and recovering the rare or precious metals from the impure copper residue.

30. A process of treating copper concentrate containing rare or precious metals comprising, leaching the concentrate to extract the copper, electrolyzing the resulting copper solution to deposit the copper as the electrolytic metal and regenerate the solvent, returning the regenerated solvent to the copper concentrate, and repeating the cycle until the copper has been sufficiently extracted, then smelting the leached concentrate residue into a matte containing the rare or precious metals, treating the resulting matte to eliminate iron and to further concentrate the matte in copper sulphide and in the rare or precious metals, roasting the enriched matte, leaching the roasted matte to extract the copper, and treating the roasted matte residue to recover or separate the rare or precious metals.

WILLIAM E. GREENAWALT.